(12) United States Patent
Kamei et al.

(10) Patent No.: US 11,493,011 B1
(45) Date of Patent: Nov. 8, 2022

(54) FUEL SUPPLY DEVICE

(71) Applicant: AISAN KOGYO KABUSHIKI KAISHA, Obu (JP)

(72) Inventors: Masaru Kamei, Nagoya (JP); Takashi Kanie, Kariya (JP); Satoshi Ito, Toyohashi (JP); Takuma Uno, Nishio (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/740,609

(22) Filed: May 10, 2022

(30) Foreign Application Priority Data

May 17, 2021 (JP) .............................. JP2021-083001

(51) Int. Cl.
| F02M 37/00 | (2006.01) |
| F02M 37/10 | (2006.01) |
| F02M 69/54 | (2006.01) |

(52) U.S. Cl.
CPC ........ F02M 69/54 (2013.01); F02M 37/0029 (2013.01); F02M 37/0041 (2013.01); F02M 37/103 (2013.01); F02M 37/106 (2013.01); F02M 2200/315 (2013.01)

(58) Field of Classification Search
CPC ........... F02M 37/0029; F02M 37/0041; F02M 37/10; F02M 37/103; F02M 37/106; F02M 69/54; F02M 2200/315
USPC ........................................ 123/457, 459, 497
See application file for complete search history.

(56) References Cited

U.S. PATENT DOCUMENTS

| 5,655,504 | A | * | 8/1997 | Iwai ................... F02M 37/0047 123/514 |
| 5,778,926 | A | * | 7/1998 | Tanaka ................... F02M 37/42 251/86 |
| 6,059,547 | A | | 5/2000 | Konishi et al. |
| 6,145,536 | A | * | 11/2000 | Gerhard ............... B60K 15/077 123/514 |
| 6,161,574 | A | * | 12/2000 | Gerhard ................. F02M 69/54 123/514 |
| 6,435,163 | B1 | * | 8/2002 | Fauser ................... F02M 37/10 137/563 |
| 6,792,918 | B1 | * | 9/2004 | Halsall .................. F02M 37/10 123/457 |

(Continued)

FOREIGN PATENT DOCUMENTS

| JP | 08189432 A | * | 7/1996 | ........... F02D 33/003 |
| JP | H11132130 A | | 5/1999 | |
| JP | 2006105080 A | | 4/2006 | |

Primary Examiner — Erick R Solis
(74) Attorney, Agent, or Firm — Conley Rose, P.C.

(57) ABSTRACT

A fuel supply device includes a fuel supply passage, a fuel pump, a pressure-regulating valve, and a housing. The fuel supply passage is in communication with the fuel injector. The fuel pump pumps the fuel to the fuel supply passage. The pressure-regulating valve regulates the pressure of the fuel in the fuel supply passage. The housing is disposed in the fuel tank. The housing accommodates the fuel pump and the pressure-regulating valve. The fuel supply passage is formed within the housing. The pressure-regulating valve is connected to an end portion of the fuel supply passage formed in the housing. The volume of the end portion of the fuel supply passage in the housing is configured to increase with increasing pressure of the fuel.

7 Claims, 9 Drawing Sheets

(56) References Cited

U.S. PATENT DOCUMENTS

| | | | |
|---|---|---|---|
| 6,942,787 B2 * | 9/2005 | Robinson | F02M 69/465 210/167.01 |
| 2007/0181102 A1 * | 8/2007 | Hazama | F02M 37/0029 123/514 |

* cited by examiner

FUEL SUPPLY DEVICE

CROSS-REFERENCE TO RELATED APPLICATIONS

This application claims priority to Japanese patent application serial number 2021-083001, filed May 17, 2021, which is hereby incorporated herein by reference in its entirety for all purposes.

BACKGROUND

This disclosure relates generally to fuel supply devices that feed fuel in a fuel tank to a fuel injector of an engine.

As shown in FIG. 12, one type of fuel supply device 100 pumps fuel in a fuel tank 101 to a fuel injector 109 of an engine. The fuel supply device 100 includes a fuel supply passage 103 and a pump module 102 in the fuel tank 101 that pumps fuel into the fuel supply passage 103. The pump module 102 includes a fuel pump 104, a pressure-regulating valve 105 for regulating the pressure of the fuel, and a fuel filter 106. A first pulsation damper 107 and a second pulsation damper 108 are provided between the pump module 102 and the fuel injector 109 in the fuel supply passage 103 of the fuel supply device 100. The first pulsation damper 107 and the second pulsation damper 108 suppress fluctuations of the pressure of the fuel.

In accordance with the fuel supply device 100 shown in FIG. 12, the plurality of pulsation dampers 107, 108 are provided along the fuel supply passage 103 to suppress the fluctuation in the pressure of the fuel. Consequently, the configuration of the fuel supply device 100 becomes more complicated. Furthermore, since the plurality of pulsation dampers 107, 108 are provided with the fuel supply passage between the pump module 102 and the fuel injector 109, it is relatively costly to take countermeasures against fuel leakage due to aging and other factors.

SUMMARY

In one aspect of the present disclosure, a fuel supply device that pumps fuel in a fuel tank to a fuel injector of an engine may include a fuel supply passage, a fuel pump, a pressure-regulating valve, and a housing. The fuel supply passage may communicate with the fuel injector. The fuel pump may pump the fuel to the fuel supply passage. The pressure-regulating valve may regulate the pressure of the fuel in the fuel supply passage. The housing may be disposed in the fuel tank, and may accommodate the fuel pump and the pressure-regulating valve. The fuel supply passage may be formed within the housing. The pressure-regulating valve may be connected to the end portion of the fuel supply passage formed in the housing. The volume of the end portion of the fuel supply passage in the housing may be configured to increase as the pressure of the fuel increases.

DETAILED DESCRIPTION

An objective of the embodiments of the present disclosure is to suppress the fluctuation in the pressure of the fuel using a simple configuration. Furthermore, another objective of the embodiments of the present disclosure is to make it easy to take measures against fuel leakage when implementing a configuration to suppress the fluctuation in the pressure.

Figure 1:
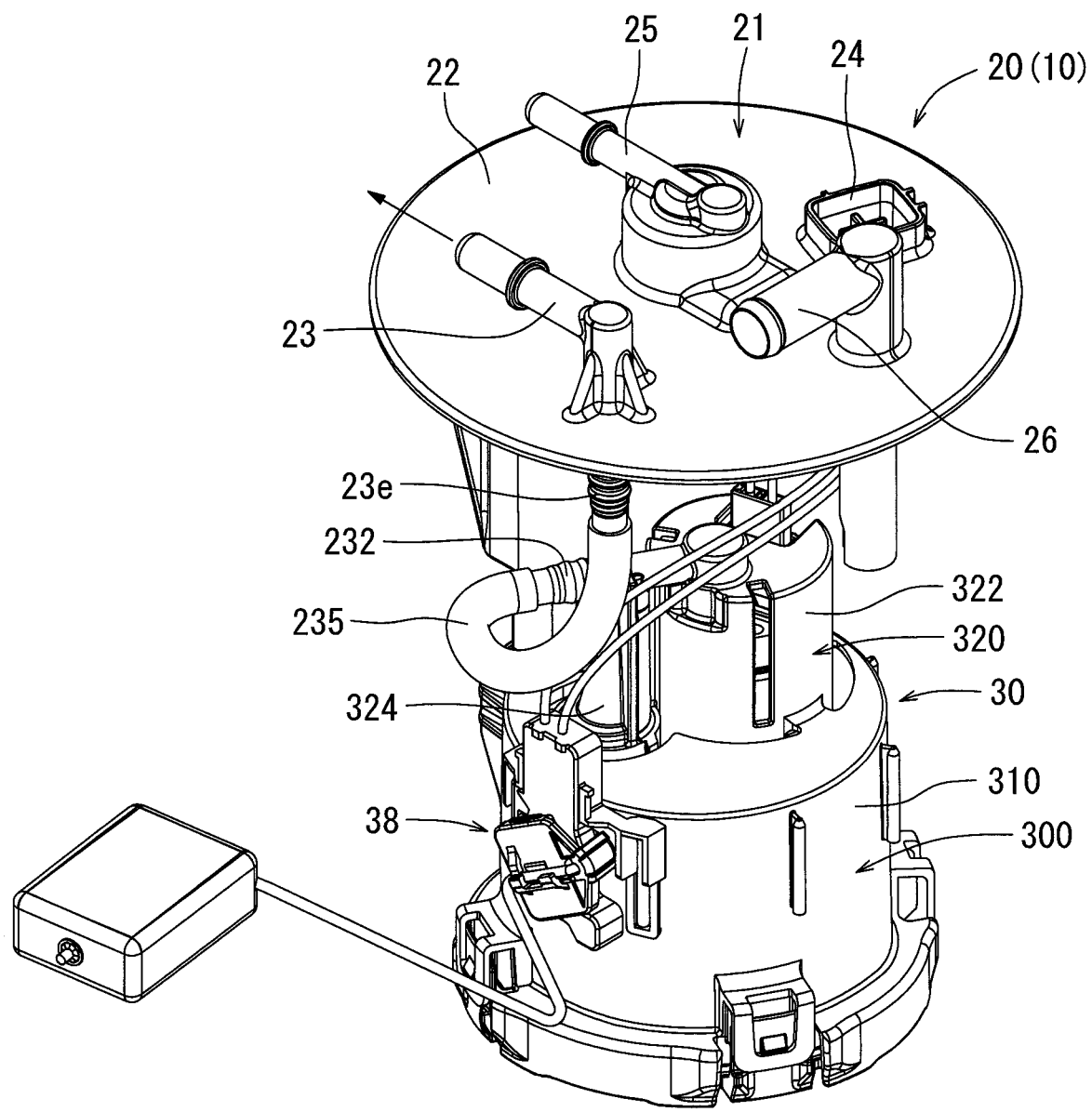
FIG. 1 is a perspective view of a fuel supply device (a fuel supply device main body) according to a first embodiment of the present disclosure.
Figure 2:
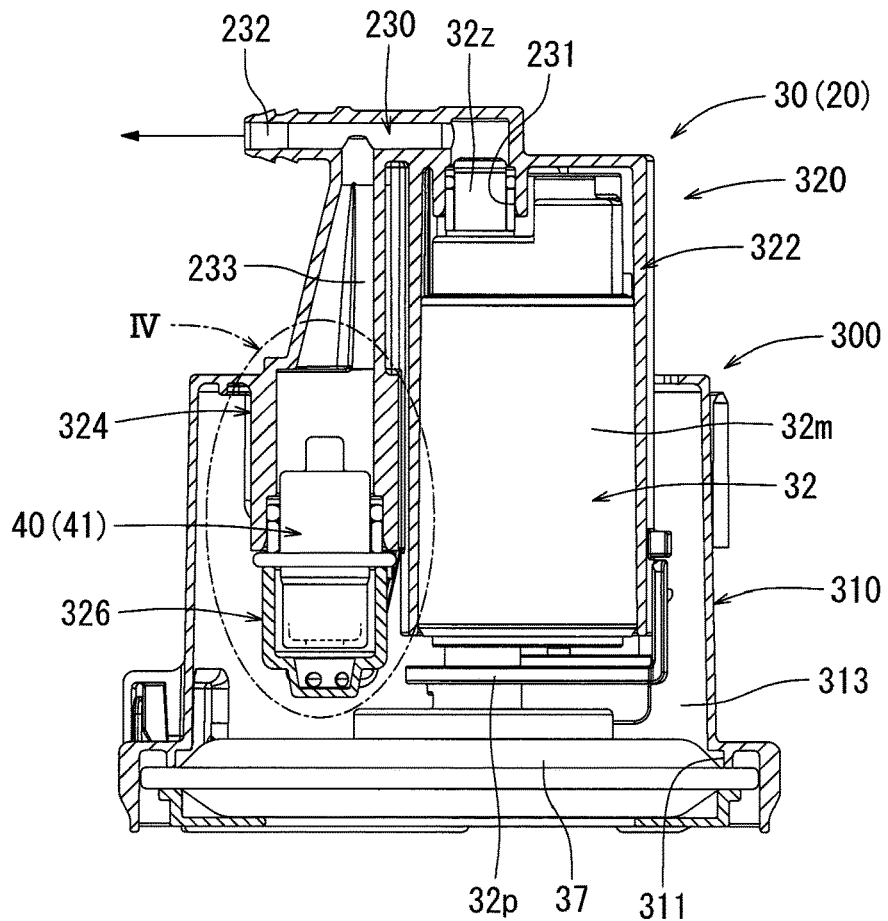
FIG. 2 is a vertical cross-sectional view of the pump unit of the fuel supply device of FIG. 1.
Figure 3:
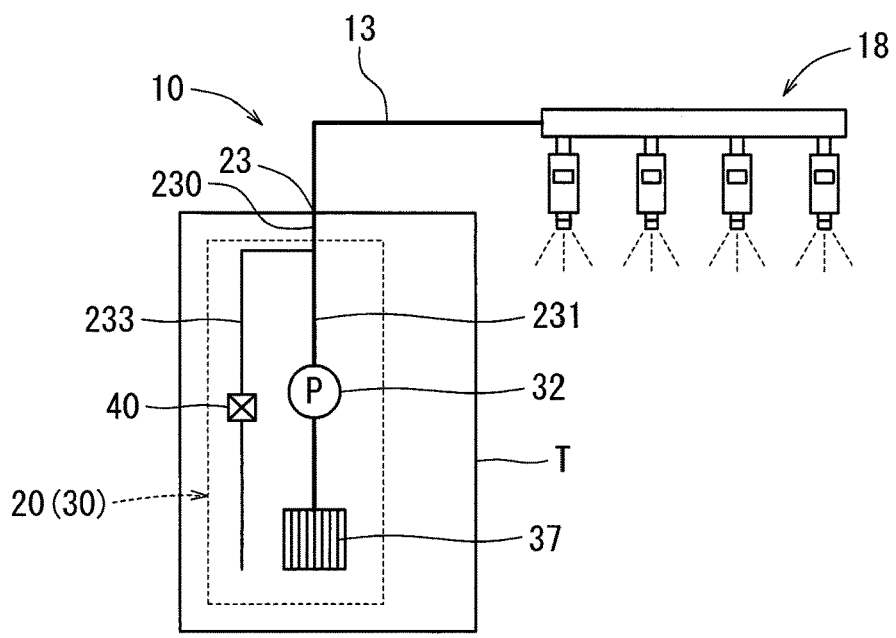
FIG. 3 is a schematic view of piping system between the fuel supply device of FIG. 1 and a fuel injector of an engine.

Referring to FIGS. 1 to 7, a first embodiment of a fuel supply device 10 will be described. The fuel supply device 10 is a device mounted on a vehicle, such as an automobile, and pumps fuel in a fuel tank T to a fuel injector 18 of an engine as shown in FIG. 3.

As shown in the piping system diagram of FIG. 3, the fuel supply device 10 includes a fuel supply device main unit 20 and a fuel supply pipe 13. The fuel supply device main unit 20 is disposed in the fuel tank T. The fuel supply pipe 13 supplies the fuel discharged from the fuel supply device main unit 20 to the fuel injector 18 of the engine. As shown in FIG. 1, the fuel supply device main unit 20 includes a lid 21 and a pump unit 30. The lid 21 closes the upper opening (not shown) of the fuel tank T. The pump unit 30 is disposed at the bottom of the fuel tank T.

As shown in FIG. 1, the lid 21 comprises a disc-shaped lid plate 22. A fuel discharge port 23, which has an L-shape in a side view, extends from the lid plate 22. One end of the fuel supply pipe 13 shown in FIG. 3 is connected to the fuel discharge port 23. The lid plate 22 of the lid 21 includes an electric connector 24, a pipe connecting port 25 for a canister (a fuel vapor treatment device), and a breather pipe 26 for air venting.

As shown in FIGS. 1 to 3, the pump unit 30 pumps the fuel. The pump unit 30 includes a fuel pump 32, a pressure-regulating valve 40, a fuel filter 37, and a fuel level gauge 38 (see FIG. 1). As shown in FIG. 2, the fuel pump 32, the pressure-regulating valve 40, and the fuel filter 37 are accommodated in a housing 300.

As shown in FIGS. 1 and 2, the housing 300 includes a main container 310, which has a large-diameter, and a central container 320, which is located in the center of the main container 310 and vertically oriented. The bottom of the main container 310 comprises an opening 311 (see FIG. 2). As shown in FIG. 2, the fuel filter 37 that filters fuel is attached to the opening 311 of the main container 310 of the housing 300. The inside of the main container 310 functions as a sub-tank 313 that stores the fuel that has passed through the fuel filter 37.

As shown in FIG. 2, the central container 320 of the housing 300 includes a pump case 322 and a regulator case 324. The pump case 322 has a substantially cylindrical shape and accommodates a motor 32$m$ of the fuel pump 32. The regulator case 324 has a substantially cylindrical shape and accommodates the pressure-regulating valve 40. The pump case 322 and the regulator case 324 of the central container 320 are positioned side-by-side. The lower sides of the pump case 322 and the regulator case 324 are positioned lower in the vertical height direction than their center position as arranged within the main container 310.

The lower end of the pump case 322 of the central container 320 is opened. Therefore, the motor 32$m$ of the fuel pump 32 is inserted into the pump case 322 of the central container 320 from the bottom. The lower part of the fuel pump 32 has a pump section 32$p$. In the state where the motor 32$m$ of the fuel pump 32 has been inserted into the pump case 322 of the central container 320, the pump part 32$p$ protrudes downward from the pump case 322. As a result, the pump 32$p$ of the fuel pump 32 can uptake the fuel in the fuel tank T that has passed through the fuel filter 37 and the fuel in the sub-tank 313.

As shown in FIG. 2, a fuel supply passage 230 is horizontally formed in the upper part of the central container 320 of the housing 300. An inlet 231 of the fuel supply passage 230 is provided at the upper end of the pump case 322 in a state of being bent downward. The inlet 231 is connected to a discharge port 32Z, which is disposed on the upper end of the fuel pump 32 (the motor 32$m$). A communication passage 233, which communicates with the regulator case 324, is connected to the middle of the fuel supply passage 230. As shown in FIG. 1, an outlet 232 of the fuel supply passage 230 is connected to a tank inner connecting part 23$e$ of the fuel discharge port 23 on the lid 21 via a connecting tube 235. A float-type fuel level gauge 38 for measuring the amount of the fuel in the fuel tank T (i.e. the position of the liquid level) is attached on the side of the main container 310 of the housing 300.

Figure 4:
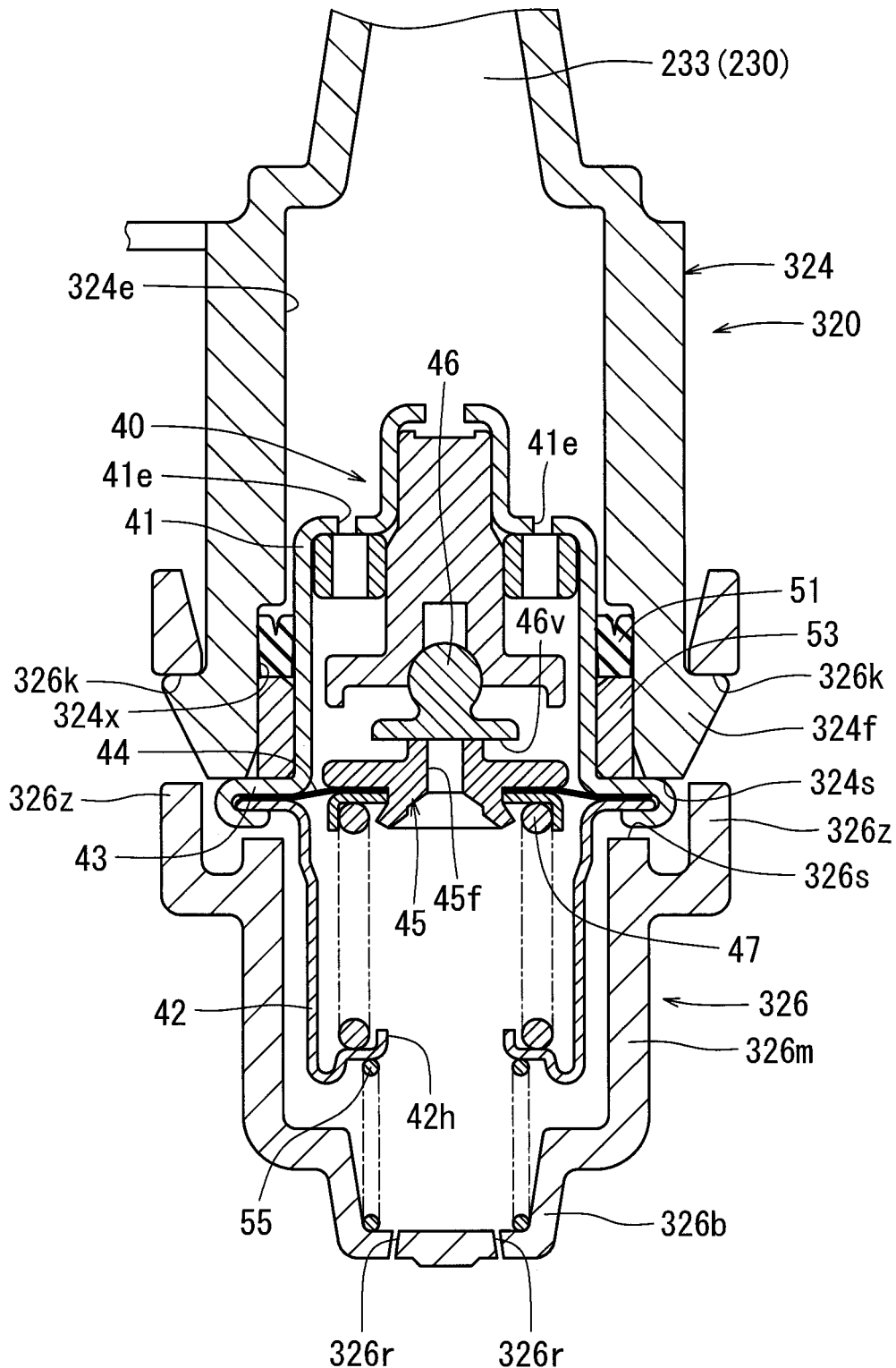
FIG. 4 is an enlarged vertical cross-sectional partial view of the pump unit of FIG. 2 taken in part IV of FIG. 2 and illustrating the pressure-regulating valve of the pump unit of FIG. 1.

The regulator case 324 of the central container 320 is the section that accommodates the pressure-regulating valve 40, as described above. As shown in FIG. 4, the lower side of the regulator case 324 of the central container 320 is opened. Therefore, the pressure-regulating valve 40 can be inserted into the regulator case 324 from below. After insertion of the pressure-regulating valve 40, the lower side of the regulator case 324 is closed by a case lid 326, which has a cap-shape. That is, the pressure-regulating valve 40 is connected to the fuel supply passage 230 via the communication passage 233 and the regulator case 324.

As shown in FIG. 4, the regulator case 324 includes an upper accommodation chamber 324$e$ and a lower accommodation chamber 324$x$. The upper accommodation chamber 324$e$ has an inner diameter dimension slightly larger than the outer diameter dimension of an upper casing 41 of the pressure-regulating valve 40. The lower accommodation chamber 324$x$ is formed via a step on the lower side of the upper accommodation chamber 324$e$ and has a larger inner diameter than the upper accommodation chamber 324$e$. The outer peripheral surface of the lower end of the regulator case 324 has a plurality of hooks 324$f$ at equal circumferential intervals. The lower end surface of each hook 324$f$ of the regulator case 324 is formed as a stopper surface 324$s$ that is configured to abut a flange 43 of the pressure-regulating valve 40 from above.

Figure 5:
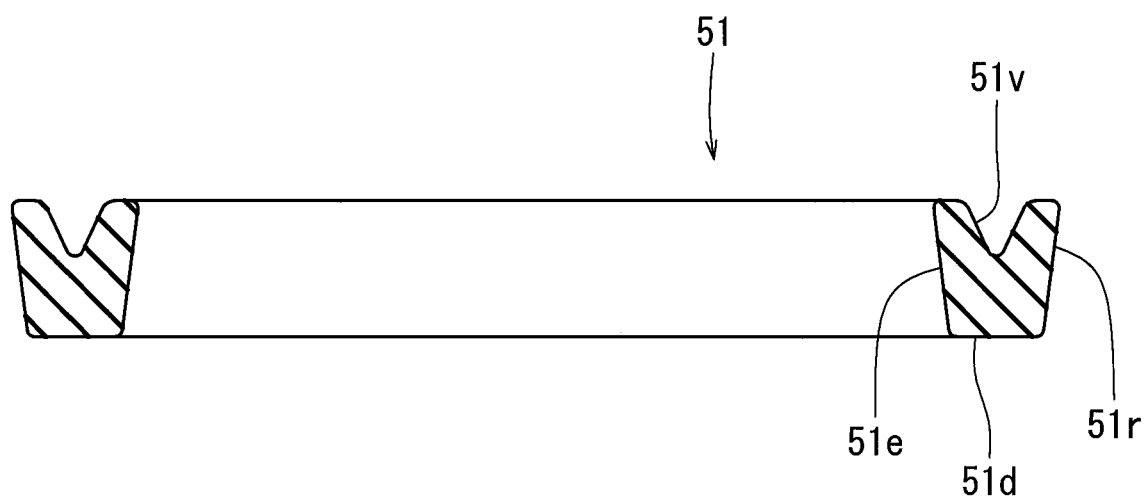
FIG. 5 is a vertical cross-sectional view of the seal that is disposed between the casing of the pressure-regulating valve and the inner surface of a housing of the pump unit (the regulator case) shown in FIG. 2.

As shown in FIG. 4, a seal 51 and a spacer 53 are provided in the lower accommodation chamber 324$x$ of the regulator case 324. The seal 51 seals between the inner surface of the lower accommodation chamber 324$x$ of the regulator case 324 and the outer peripheral surface of the upper casing 41 of the pressure-regulating valve 40. The spacer 53 has a cylindrical shape. The pressure-regulating valve 40 may move in the vertical direction by a certain dimension along the inner surface of the lower accommodating chamber 324$x$ of the regulator case 324, while the space therebetween is still sealed by the seal 51. As shown in FIG. 5, the seal 51 has an annular shape, and its cross-sectional shape is an inverted trapezoid, which is wider at the upper side and narrower at the lower side. That is, the seal 51 has an inner circumferential inclined surface 51$e$, an outer circumferential inclined surface 51$r$, a flat lower surface 51$d$, and an upper pressure-receiving surface 51$v$ having a V-shaped cross section.

As shown in FIG. 4, the upper pressure-receiving surface 51$v$ of the seal 51 is configured to receive (i.e., be exposed to) the pressure of the fuel in the regulator case 324. The inner circumferential inclined surface 51$e$ of the seal 51 is in contact with the outer circumferential surface of the upper casing 41 of the pressure-regulating valve 40. The outer circumferential inclined surface 51$r$ of the seal 51 is in contact with the inner surface of the lower accommodating chamber 324$x$ of the regulator case 324. The flat lower surface 51$d$ of the seal 51 is in contact with the upper surface of the spacer 53. That is, the seal 51 seals between the regulator case 324 and the upper casing 41 of the pressure-regulating valve 40. Here, the seal 51 and the spacer 53 are retained in the pressure regulator valve 40. Therefore, when the pressure-regulating valve 40 moves up and down along the inner surface of the regulator case 324, the seal 51 and the spacer 53 move together with the pressure-regulating valve 40. It is preferable to use a seal 51 and a spacer 53 that have a low sliding resistance when sliding against the regulator case 324.

As shown in FIG. 4, the case lid 326 that closes the lower end of the regulator case 324 includes a lid body 326$m$ and a connecting wall 326$z$. A lower casing 42 of the pressure-regulating valve 40 is accommodated in the lid body 326$m$. The connecting wall 326$z$ is provided on the outer peripheral surface of the upper end of the lid body 326$m$. The connecting wall 326$z$ of the case lid 326 has an inner diameter dimension that sized to enclose the lower end of the regulator case 324. In the connecting wall 326$z$ of the case lid 326, an engaging hole 326$k$, to which a corresponding hook 324$f$ of the regulator case 324 may be engaged, is aligned with a corresponding hook 324$f$ of the regulator case 324.

That is, as shown in FIG. 4, the hook 324$f$ of the regulator case 324 can engage the engaging hole 326$k$ of the connecting wall 326$z$ of the case lid 326, thereby securing the case lid 326 to the regulator case 324 with the lower part of the regulator case 324 closed. The upper end surface of the lid body 326$m$ of the case lid 326 defines a stopper surface 326$s$ configured to contact the flange 43 of the pressure-regulating valve 40 from below. In the state where the case lid 326 is fixed to the regulator case 324, the stopper surface 324$s$ of the hook 324$f$ of the regulator case 324 and the stopper surface 326s of the lid body 326m of the case lid 326 are separated by a predetermined distance. The flange 43 of the pressure-regulating valve 40 is placed between the stopper surface 324s of the regulator case 324 and the stopper surface 326s of the case lid 326.

The flange 43 of the pressure-regulating valve 40 can move in the vertical direction between the stopper surface 324s of the regulator case 324 and the stopper surface 326s of the case lid 326. That is, the pressure-regulating valve 40 can move in the vertical direction between an upper limit position where the flange 43 abuts the stopper surface 324s of the regulator case 324 and a lower limit position where the flange 43 abuts the stopper surface 326s of the case lid 326. Further, a spring-receiving-portion 326b is provided at the lower end of the lid main body 326m of the case lid 326. The spring-receiving portion 326b receives the lower end of a return spring 55 that biases the pressure-regulating valve 40 vertically upward. A return hole 326r for returning the fuel to the sub-tank 313 is formed on the lower part of the spring-receiving portion 326b.

The pressure-regulating valve 40 regulates the pressure of the fuel in the fuel supply passage 230. As shown in FIG. 4, the pressure-regulating valve 40 includes the upper casing 41 and the lower casing 42, which are connected to each other at the flange 43. Both the upper casing 41 and the lower casing 42 have a substantially cylindrical shape. The edge of a diaphragm 44 of the pressure-regulating valve 40 is fixed at the position of the flange 43, so as to be sandwiched between the upper casing 41 and the lower casing 42. The diaphragm 44 partitions the space inside the upper casing 41 and the space inside the lower casing 42. A valve 45 is fixed to the center of the diaphragm 44. The valve 45 has a flow path 45f that penetrates the valve 45 in the vertical direction. A valve seat 46 is fixed to the center of the upper casing 41. The valve seat 46 has a valve seat surface 46v at the lower end thereof. When the upper end of the valve 45, which is fixed to the diaphragm 44, abuts the valve seat surface 46v of the valve seat 46, the flow path 45f of the valve 45 is closed (see FIG. 4).

As shown in FIG. 4, a pressure-regulating spring 47 for setting the pressure of the fuel is provided in the lower casing 42. A lower end opening 42h is formed at the center of the lower end of the lower casing 42. A fuel inflow passage 41e is formed at the upper part of the upper casing 41. The fuel inflow passage 41e leads the fuel in the regulator case 324, which is in fluid communication with the fuel supply passage 230, into the upper casing 41. Accordingly, the pressure of the fuel in the fuel supply passage 230 is applied to the diaphragm 44 from above. Additionally, the diaphragm 44 is subjected to the biasing force of the pressure-regulating spring 47, which applies an upward biasing force to the diaphragm 44. That is, the biasing force of the pressure-regulating spring 47 is applied to the opposite side of the diaphragm 44 to which the pressure of the fuel is applied.

Figure 6:
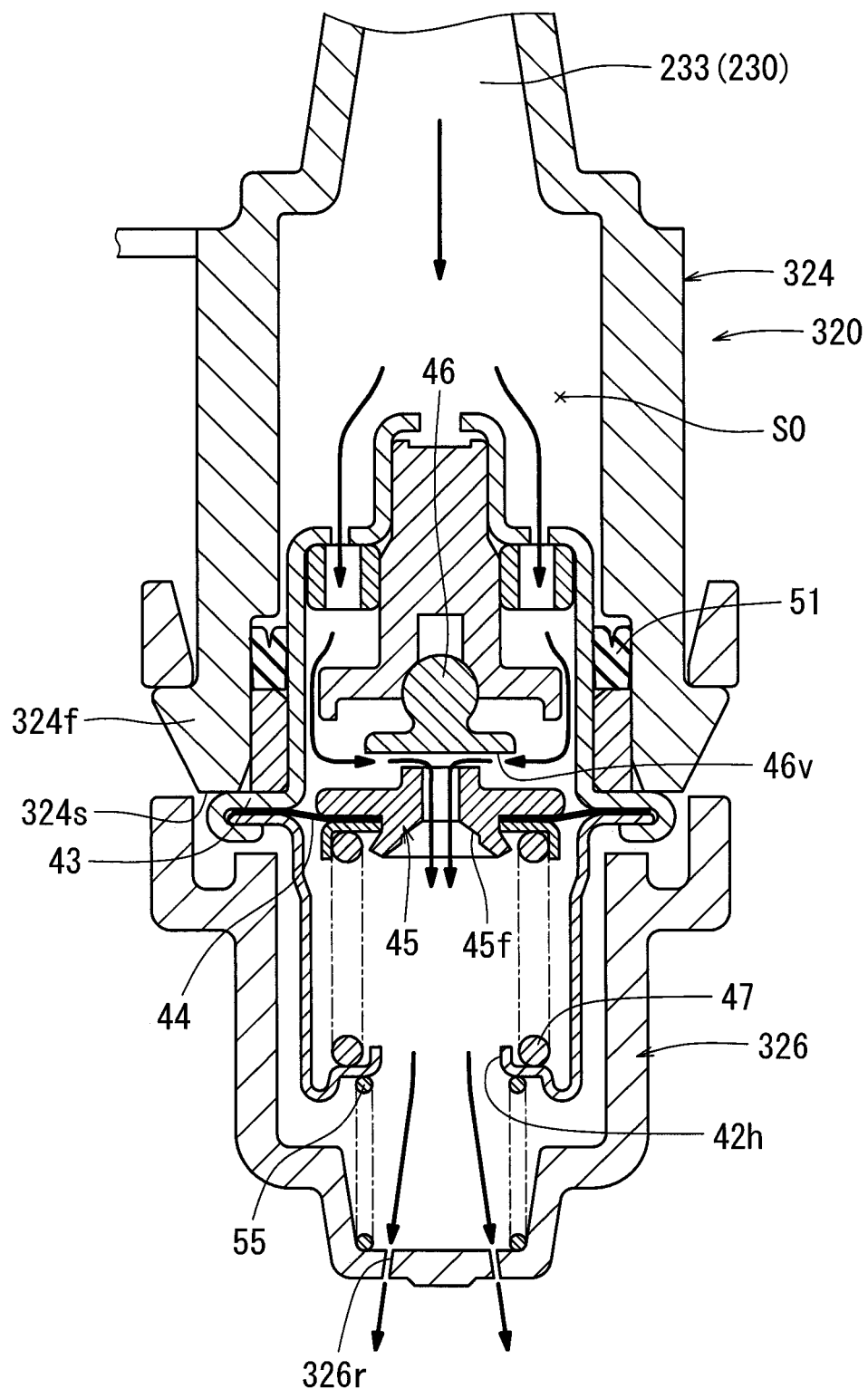
FIG. 6 is a vertical cross-sectional view of the pressure-regulating valve of FIG. 4 in its open state.

When the pressure of the fuel in the fuel supply passage 230 becomes greater than a set pressure, which is set such that the force applied to the diaphragm 44 caused by the pressure exceeds the biasing force of the pressure-regulating spring 47, the diaphragm 44 deforms downward against the biasing force of the pressure-regulating spring 47, as shown in FIG. 6. As a result, the upper end of the valve 45 is separated from the valve seat surface 46v, thereby opening the flow path 45f of the valve 45. In this state, a part of the fuel in the fuel supply passage 230 passes through the flow path 45f of the valve 45 of the pressure-regulating valve 40, into the lower end opening 42h of the lower casing 42, and then through the return hole 326r of the case lid 326 to return to the sub-tank 313. That is, the pressure-regulating valve 40 operates so that the pressure of the fuel can be decreased. When the pressure of the fuel in the fuel supply passage 230 becomes lower than the set pressure, the biasing force of the spring of the pressure-regulating spring 47 pushes the diaphragm 44 upward, thereby urging the valve 45 into contact with the valve seat surface 46v and closing the flow path 45f. That is, the pressure-regulating valve 40 also operates so that the pressure of the fuel can be increased.

In the pump unit 30 of the fuel supply device 10, the biasing force of the pressure-regulating spring 47 of the pressure-regulating valve 40 is set so that the pressure of the fuel in the fuel supply passage 230 is regulated to the set pressure. When the fuel pump 32 in the pump unit 30 is driven, as shown in FIG. 2, the fuel in the fuel tank T is supplied to the fuel pump 32 through the fuel filter 37. Then, the fuel is discharged to the fuel supply passage 230 of the housing 300 via the discharge port 32z. The fuel pumped into the fuel supply passage 230 is then fed to both the regulator case 324 via the communication passage 233 and to the outlet 232 of the fuel supply passage 230. In this way, the fuel can be discharged from the outlet 232 of the fuel supply passage 230 in a state of being regulated to the set pressure by the pressure-regulating valve 40.

The fuel discharged from the outlet 232 of the fuel supply passage 230 is sent to the fuel discharge port 23 of the lid 21 via the connecting tube 235, as shown in FIG. 1. Then, the fuel is sent from fuel discharge port 23 to the fuel injector 18 of the engine via the fuel supply pipe 13, as shown in FIG. 3. As described above, the biasing force of the pressure-regulating spring 47 of the pressure-regulating valve 40 is set so that the pressure of the fuel is regulated to the set pressure. Therefore, in a state where the fuel pressure is being regulated to the set pressure, the valve 45 of the pressure-regulating valve 40 opens and closes the flow path 45f according to the discharge state of the fuel pump 32, as shown in FIG. 6.

Accordingly, the fuel, which has passed through the flow path 45f of the valve 45 of the pressure-regulating valve 40, passes through the lower end opening 42h of the pressure-regulating valve 40 and through the return hole 326r of the case lid 326, so as to return to the sub-tank 313 in the housing 300. Here, the biasing force of the return spring 55 is set to be greater than the biasing force of the pressure-regulating spring 47, which is configured to regulate the pressure of the fuel to the set pressure. Therefore, as shown in FIG. 6, when the pressure of the fuel is slightly above the set pressure, the pressure-regulating valve 40 receives the biasing force of the return spring 55 and the upper surface of the flange 43 is held at the upper limit position, where the upper surface of the flange 43 abuts the stopper surface 324s of the regulator case 324. The internal volume of the regulator case 324 in the above state is considered to be the value S0.

Figure 7:
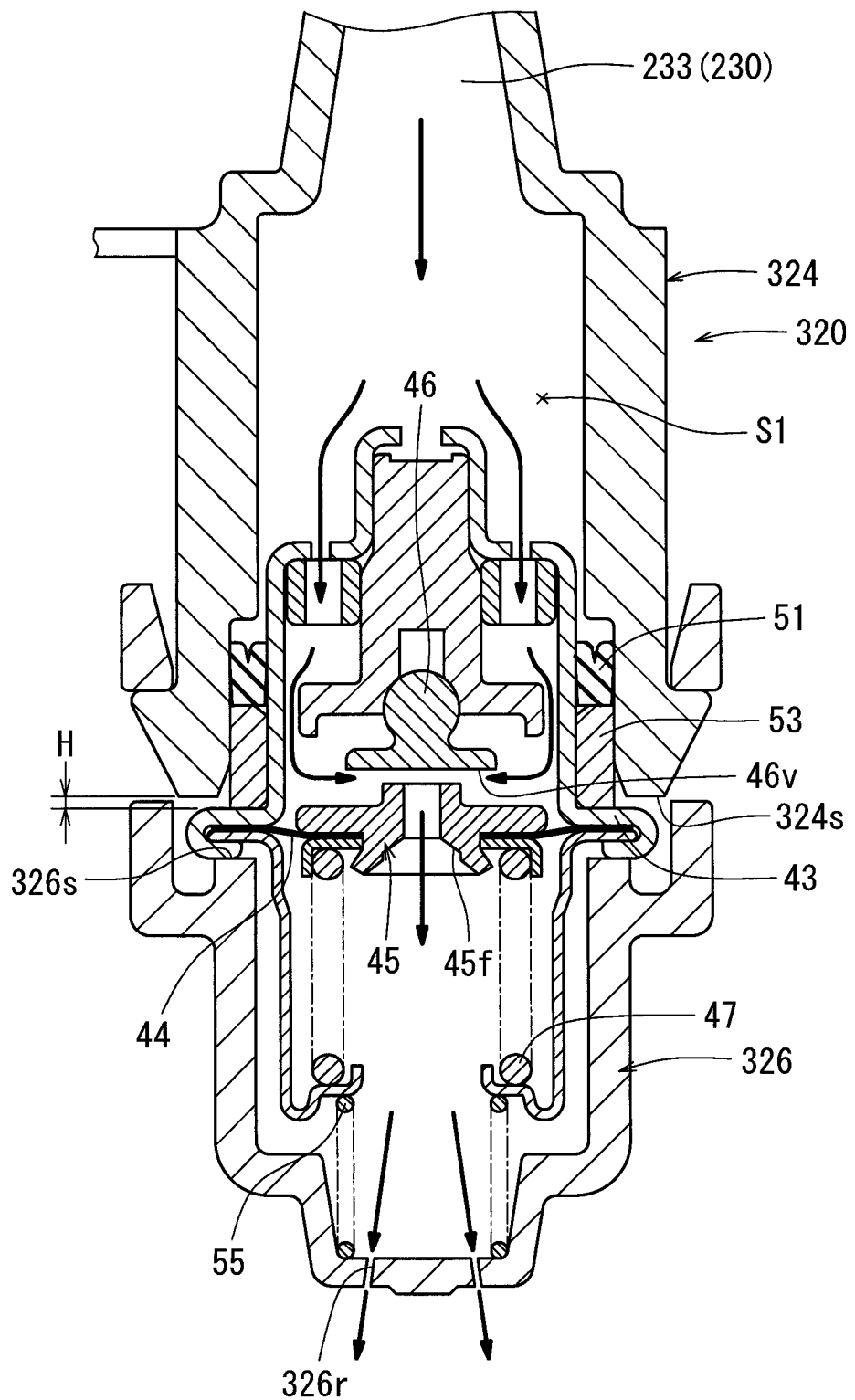
FIG. 7 is a vertical cross-sectional view of the pressure-regulating valve of FIG. 4 illustrating the state where the casing of the pressure-regulating valve is moved downward in the housing (the regulator case).

During vehicle operation, the pressure of the fuel may pulsate significantly due to operating conditions and other factors. As shown in FIG. 7, if the pressure of the fuel in the fuel supply passage 230 increases significantly over the set pressure, for instance due to the above mentioned pulsation, the diaphragm 44 of the pressure-regulating valve 40 deforms further downward against the biasing force of the pressure-regulating spring 47 so as to open the flow path 45f of the valve 45. Further, the entire pressure-regulating valve 40 moves downward against the biasing force of the return spring 55, since the upper surface of the upper casing 41 of the pressure-regulating valve 40 is subjected to the pressure of the fuel at a greater force than the biasing force of the return spring 55.

The pressure-regulating valve 40 may move vertically downward by a certain distance H. The further lowering of the pressure-regulating valve 40 is stopped when the lower surface of the flange 43 comes into contact with the stopper surface 326s of the case lid 326. As a result, the pressure-regulating valve 40 is held at the lower limit position. The internal volume of the regulator case 324 in the above state is considered to be the value S1. That is, the internal volume of the regulator case 324 is increased within the range of (S1-S0). Thereby, suppressing or relieving the increase in the pressure of the fuel in the fuel supply passage 230. Further, when the pressure of the fuel in the fuel supply passage 230 decreases due to the pulsation, the pressure-regulating valve 40 quickly returns to the upper limit position in response to the biasing force of the return spring 55.

In the fuel supply device 10 of the present embodiment, the fuel supply pipe 13, the fuel supply passage 230 of the housing 300, the communication passage 233, and the internal space of the regulator case 324 correspond to an embodiment of the fuel supply passage of the present disclosure. The internal space of the regulator case 324 corresponds to an embodiment the end portion of the fuel supply passage of the present disclosure. The upper casing 41 and the lower casing 42 of the pressure-regulating valve 40 correspond to an embodiment of the casing of the pressure-regulating valve of the present disclosure. The flow paths 45f, 42h, and 326r of the valve 45 of the pressure-regulating valve 40 correspond to an embodiment of the flow path for returning the fuel in the fuel supply passage to the fuel tank in the present disclosure.

According to the fuel supply device 10 of the present embodiment, the volume of an end portion of the fuel supply passage 230 (which may correspond to a portion of the fuel supply passage 230 that includes the regulator case 324) in the housing 300 is configured to increase with the increasing pressure of the fuel. Thus, even if the pressure of the fuel is to be increased over the set pressure due, for instance, to the timing of fuel injection into the engine, the increase in pressure of the fuel is suppressed or relieved by increasing the volume of the end portion of the fuel supply passage 230. That is, by changing the volume of the end portion of the fuel supply passage 230 in the housing 300, the fluctuation in the pressure of the fuel can be suppressed or relieved. As a result of the above described structure and operation, the configuration of the fuel supply device 10 may be simplified. In addition, the housing 300 is disposed inside of the fuel tank T. Therefore, even if the end portion of the fuel supply passage 230 (for instance the regulator case 324) is damaged, for example due to age-related deterioration, the fuel in the end portion of the fuel supply passage 230 is returned to the fuel tank T. As a result, it is possible to prevent the outflow of the fuel to the environment outside of the fuel supply device, such as to the engine compartment.

A fuel supply device according to a second embodiment of the present disclosure will be described with reference to FIGS. 8-11. The fuel supply device of the second embodiment is a modification of the configuration of the regulator case 324 and the pressure-regulating valve 40 in the fuel supply device 10 of the first embodiment. The other features and configurations of the second embodiment are similar to those of the fuel supply device 10 of the first embodiment. Therefore, the portions of the second embodiment substantially similar those of the fuel supply device 10 of the first embodiment will be denoted by the same reference numerals and redundant descriptions will be omitted.

Figure 8:
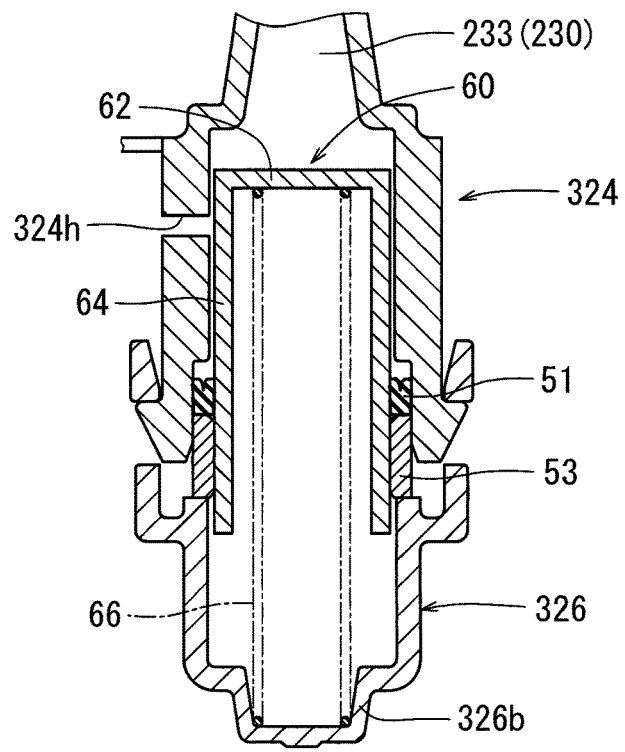
FIG. 8 is a vertical cross-sectional view of a pressure-regulating valve of a fuel supply device according to a second embodiment of the present disclosure.

As shown in FIG. 8, in the fuel supply device according to the second embodiment, a piston-shaped valve 60 is inserted into the regulator case 324. Thereby, the fuel supply device of the second embodiment has the similar function as the pressure-regulating valve 40 of the fuel supply device 10 of the first embodiment. More specifically, the valve 60 of the pressure-regulating valve according to the second embodiment includes a cylindrical portion 64 and a pressure-receiving plate 62. The pressure-receiving plate 62 has a disk-shape and closes an upper end opening of the cylindrical portion 64. The upper surface of the pressure-receiving plate 62 functions as a pressure-receiving surface configured to receive the pressure of the fuel. The outer peripheral surface of the cylindrical portion 64 of the valve 60 and the inner surface of the regulator case 324 are sealed by a seal 51. That is, the valve 60 is configured to move inside the regulator case 324 in the vertical direction while in a state of being sealed by the seal 51. It is preferable to use a seal 51 having a low sliding resistance with respect to the regulator case 324. A pressure-regulating spring 66, which is configured to apply an upward biasing force to the valve 60, is provided between the pressure-receiving plate 62 of the valve 60 and the spring-receiving portion 326b of the case lid 326. A fuel return hole 324h for returning the fuel in the regulator case 324 to the sub-tank 313 is formed in the wall of the regulator case 324 at a predetermined vertical position.

As shown in FIG. 8, when the pressure of the fuel in the fuel supply passage 230 (in particular the portion corresponding to the regulator case 324) is lower than a set pressure, the valve 60 is pushed up by the biasing force of the pressure-regulating spring 66. In this state, the fuel return hole 324h of the regulator case 324 is closed by the cylindrical portion 64 of the valve 60. However, as the fuel pressure is increased, the valve 60 moves downward against the biasing force of the pressure-regulator spring 66 due to the increased pressure of the fuel. As a result, the internal volume of the regulator case 324 is increased, and the increase in the pressure of the fuel may be suppressed or relieved.

Figure 9:
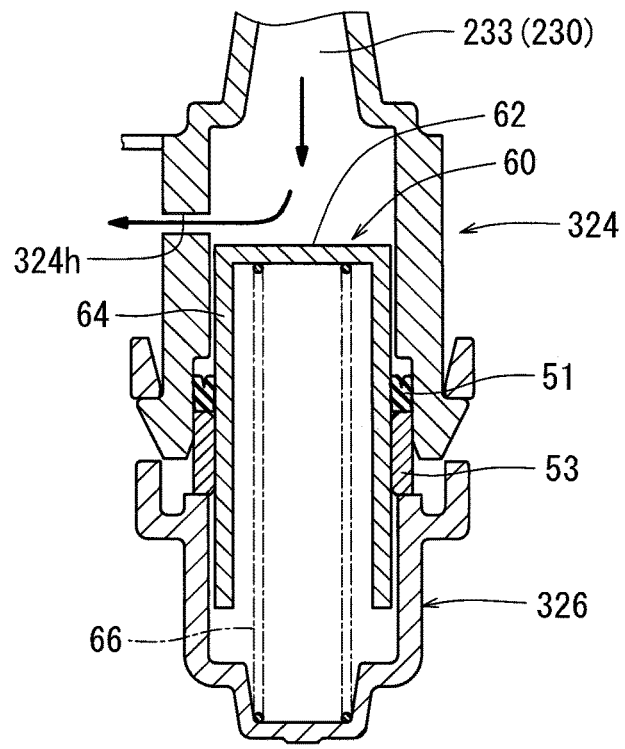
FIG. 9 is a vertical cross-sectional view of the operation of the pressure-regulating valve of the fuel supply device of FIG. 8.

As shown in FIG. 9, as the pressure of the fuel is increased to be greater than the set pressure, the pressure of the fuel causes the valve 60 to move further downward against the biasing force of the pressure-regulating spring 66, thereby further increasing the internal volume of the regulator case 324. Once the valve 60 is moved downward beyond a certain point, the fuel return hole 324h of the regulator case 324 is opened. That is, the fuel pressure is regulated to be the set pressure by increasing the internal volume of the regulator case 324 and returning the fuel in the regulator case 324 to the sub-tank 313. Further, if the pressure of the fuel is increased over the set pressure, for instance due to a pulsation, the valve 60 moves further downward against the biasing force of the pressure-regulating spring 66 due to the pressure of the fuel. Therefore, the internal volume of the regulator case 324 is further increased and the further increase of the pressure of the fuel is suppressed or relieved. Thus, the pressure of the fuel may be regulated with a simpler configuration than that described for the first embodiment.

Figure 10:
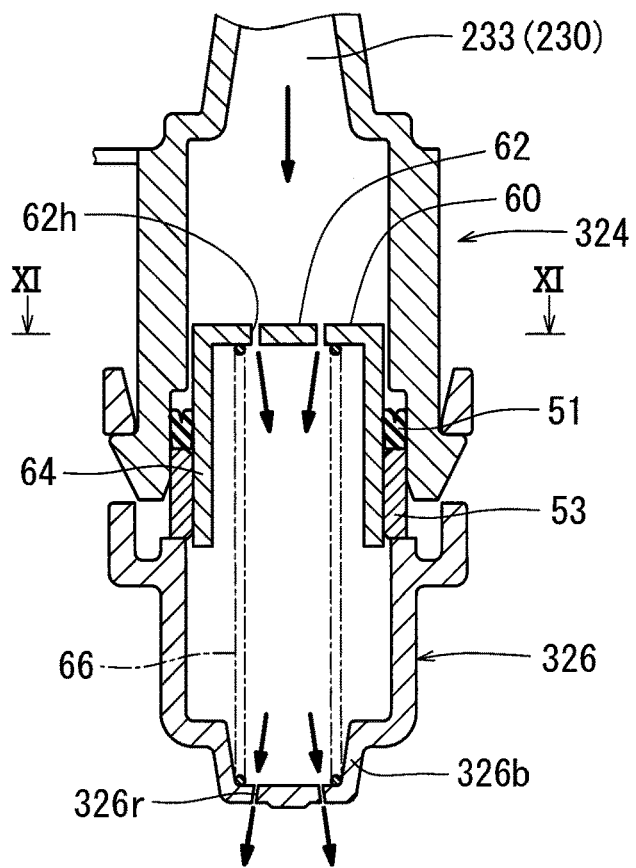
FIG. 10 is a vertical cross-sectional view of a pressure-regulating valve of a fuel supply device according to a third embodiment of the present disclosure.
Figure 11:
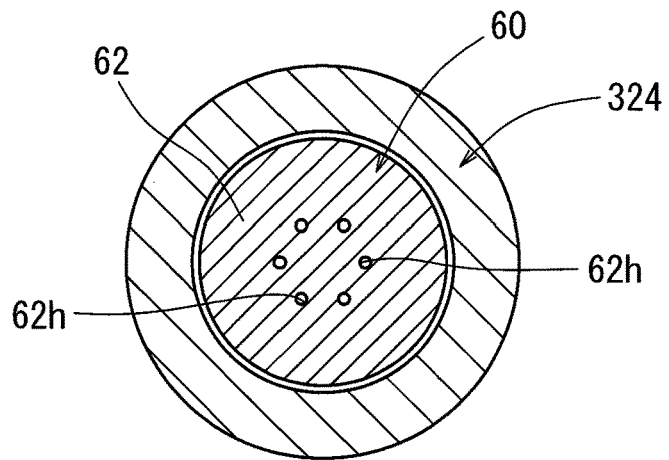
FIG. 11 is a cross-sectional view of the pressure-regulating valve of the fuel supply device of FIG. 10 taken in section XI-XI of FIG. 10.
Figure 12:
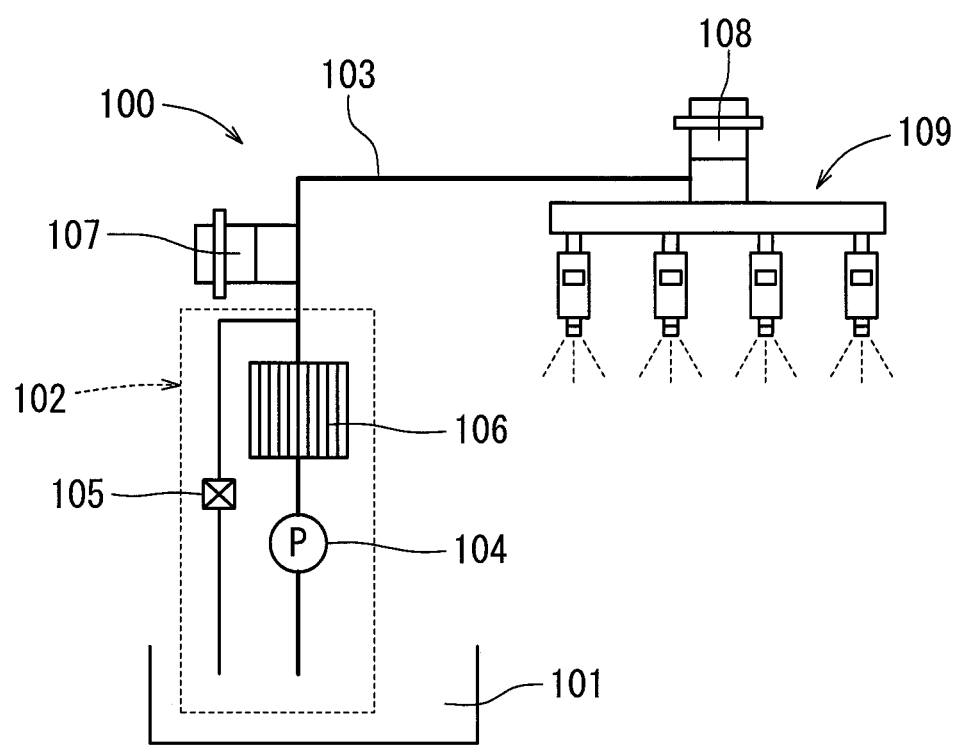
FIG. 12 is a schematic view of the piping system between a conventional fuel supply device and a fuel injector of an engine.

The present invention is not limited to the above embodiments, but instead may be modified without departure from the scope of the disclosure. For example, the fuel return hole 324h of the second embodiment is formed in the wall of the regulator case 324. However, as shown in FIGS. 10 and 11, it is also possible to form a plurality of fuel return holes 62h, for instance composed of small-diameter through holes, in the pressure-receiving plate 62 of the valve 60. This may be done instead of or in addition to forming the fuel return hole 324h in the wall of the regulator case 324. According to the above-configuration, the surplus fuel, which is discharged from the fuel pump 32 and generated when the pressure is regulated by the pressure-regulating valve 40, is configured to be returned to the sub-tank 313 via the fuel return hole 62h of the pressure-receiving plate 62 of the valve body 60. Additionally, the valve 60 is pushed down against the biasing force of the pressure-regulating spring 66 as the pressure of the fuel is increased. As a result, the internal volume of the regulator case 324 is increased, thereby suppressing the increase in pressure of the fuel.

The first embodiment and the second embodiment show examples in which the internal volume of the regulator case 324 is increased or decreased by accommodating the pressure-regulating valve 40 or the valve 60 in the regulator case 324 so as to be movable in the vertical direction. However, instead of moving the pressure-regulating valve 40 or the valve 60 in the vertical direction, it is also possible to configure the regulator case 324 such that the internal volume of the regulator case 324 may be increased or decreased by deforming the upper wall of the regulator case 324, e.g., the wall located above the pressure regulator valve 40, in the direction of diameter expansion or diameter contraction. The fuel injection method of the first embodiment and the second embodiment may be either direct injection or port injection.

The various examples described above in detail with reference to the attached drawings are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide a fuel supply device and/or methods of making and using the same.

In accordance with the first aspect, the volume of the end portion of the fuel supply passage in the housing is configured to increase with increasing the pressure of the fuel. Therefore, even if the pressure of the fuel is to be increased over a set pressure, for instance due to the timing of the fuel injection into the engine, the increase in the pressure of the fuel may be suppressed or relieved by increasing the volume of the end portion of the fuel supply passage. That is, by changing the volume of the end portion of the fuel supply passage in the housing, the fluctuation in the pressure of the fuel may be suppressed or relieved. As a result, the configuration of the fuel supply device may be simplified. In addition, the housing, which has the fuel supply passage formed therein, is disposed inside of the fuel tank. Therefore, even if the end portion of the fuel supply passage is damaged, for instance due to age-related deterioration, the fuel is returned to the fuel tank. As a result, it is possible to prevent outflow of fuel to outside of the fuel supply device, such as outside the engine compartment.

A second aspect of the fuel supply device includes a seal provided between the casing of the pressure-regulating valve and the inner surface of the housing. The casing of the pressure-regulating valve is configured to allow the volume of the end portion of the fuel supply passage to increase and decrease by moving along the inner surface of the housing while continuing to be sealed by the seal. In accordance with the second aspect, a pulsation in the pressure of the fuel may be efficiently suppressed or relieved.

In a third aspect of the fuel supply device, the casing of the pressure-regulating valve may include a diaphragm, a valve, and a pressure-regulating spring. The diaphragm is exposed to the pressure of the fuel in the fuel supply passage. The valve is integrated with the diaphragm and opens and closes a flow path that returns the fuel in the fuel supply passage to the fuel tank. The pressure-regulating spring presses the diaphragm from the side of the diaphragm opposite to the side receiving the pressure of the fuel. A return spring is provided at the outside of the casing of the pressure-regulating valve. The return spring biases the casing toward a direction opposite to the direction in which the pressure of the fuel in the fuel supply passage applies to the casing. In accordance with the third aspect, when the pressure of the fuel is increased and then suddenly decreased, the casing of the pressure-regulating valve quickly returns to its original position due at least in part to the function of the return spring.

In a fourth aspect of the fuel supply device, the biasing force of the return spring is set larger than the biasing force of the pressure-regulating spring. In accordance with the fourth aspect, even if the pressure of the fuel in the fuel supply passage is maintained at the set pressure and the flow passage of the valve is opened (the pressure-regulating spring is deformed), the casing of the pressure-regulating valve is held in a predetermined position by the biasing force of the return spring. When the pressure of the fuel is increased over the set pressure, the casing of the pressure-regulating valve can move in the direction resulting in increasing the volume of the fuel supply passage, which is a direction against the biasing force of the return spring.

In a fifth aspect of the fuel supply device, the pressure-regulating valve may include a valve and a pressure-regulating spring. The valve has a pressure-receiving surface that is exposed to the pressure of the fuel in the fuel supply passage. The pressure-regulating spring biases or pushes the valve from a side of the valve opposite the surface against which the pressure of the fuel acts. A seal is provided between the valve and the inner surface of the housing. The valve is configured to allow the volume of the end portion of the fuel supply passage to increase and decrease by moving along the inner surface of the housing while the end portion of the fuel supply passage continues to be sealed by the seal. In accordance with the fifth aspect, a pulsation of the pressure of the fuel is efficiently suppressed or relieved.

In a sixth aspect of the fuel supply device, a fuel return hole may be formed on the wall of the housing. The fuel return hole may be configured to return the fuel in the fuel supply passage to the fuel tank. The valve is configured to move along the inner surface of the housing between a position of closing the fuel return hole and a position opening the fuel return hole. In accordance with the sixth aspect, in the state where the valve closes the fuel return hole (which may correspond to a state where the pressure of the fuel is lower than the set pressure), a pulsation of the pressure of the fuel may be absorbed. Further, in the state where the valve opens the fuel return hole (which may correspond to a state where the fuel pressure is at the set pressure), a pulsation of the pressure of the fuel may still be absorbed.

In a seventh aspect of the fuel supply device, the fuel return hole may be formed in the pressure-receiving surface of the valve, so as to return the fuel in the fuel supply passage to the fuel tank. In accordance with the seventh aspect, a pulsation of the pressure of the fuel may be absorbed in the range from a fuel pressure lower than the set pressure to a fuel pressure at the set pressure.

According to the present disclosure, a pulsation of the fuel may be suppressed or relieved with a simple configuration. Further, the present disclosure make it easy to take measures against fuel leakage from the configuration that is configured to suppress the fluctuation of the pressure.

What is claimed is:

1. A fuel supply device for pumping fuel in a fuel tank to a fuel injector of an engine, the fuel supply device comprising:
   a fuel supply passage in fluid communication with the fuel injector;
   a fuel pump configured to pump the fuel to the fuel supply passage;
   a pressure-regulating valve configured to regulate a pressure of the fuel in the fuel supply passage; and
   a housing disposed in the fuel tank, wherein the housing accommodates the fuel pump and the pressure-regulating valve, and wherein the fuel supply passage extends into the housing;
   wherein:
      the pressure-regulating valve is coupled to an end portion of the fuel supply passage in the housing; and
      a volume of the end portion of the fuel supply passage in the housing is configured to increase as a pressure of the fuel increases.

2. The fuel supply device of claim 1, wherein:
   a seal is positioned between a casing of the pressure-regulating valve and an inner surface of the housing; and
   the volume of the end portion of the fuel supply passage is configured to increase or decrease in response to movement of the pressure-regulating valve along the inner surface of the housing while the casing of the pressure-regulating valve remains sealed by the seal.

3. The fuel supply device of claim 2, wherein an interior of the casing of the pressure-regulating valve comprises:
   a diaphragm configured to be exposed to the pressure of the fuel in the fuel supply passage;
   a valve integrated with the diaphragm and configured to open and close a flow path that returns the fuel in the fuel supply passage to the fuel tank; and
   a pressure-regulating spring that presses the diaphragm from a side of the diaphragm opposite to a direction in which the pressure of the fuel is applied to the diaphragm;
   wherein:
      a return spring is provided outside the casing of the pressure-regulating valve; and
      the return spring biases the casing in a direction opposite to the direction in which the pressure of the fuel is applied to the diaphragm.

4. The fuel supply device of claim 3, wherein the biasing force of the return spring is larger than the biasing force of the pressure-regulating spring.

5. The fuel supply device of claim 1, wherein the pressure-regulating valve comprises:
   a valve having a pressure-receiving surface configured to be exposed to the pressure of the fuel in the fuel supply passage; and
   a pressure-regulating spring that presses the valve from a side of the valve opposite to the pressure-receiving surface,
   wherein:
      a seal is provided between the valve and an inner surface of the housing; and
      the volume of the end portion of the fuel supply passage is configured to increase or decrease relative to movement of the valve along the inner surface of the housing while the casing of the pressure-regulating valve is sealed by the seal.

6. The fuel supply device of claim 5, wherein:
   a fuel return hole is formed in a wall of the housing and is configured to return fuel in the fuel supply passage to the fuel tank; and
   the valve is configured to move along the inner surface of the housing between a position that closes the fuel return hole and a position that opens the fuel return hole.

7. The fuel supply device of claim 5, wherein a fuel return hole is formed through the pressure-receiving surface of the valve and is configured to return fuel in the fuel supply passage to the fuel tank.

* * * * *